(No Model.)
A. DUDLY.
DEVICE FOR SUPPORTING AND TRUING WHEELS.
No. 536,377. Patented Mar. 26, 1895.
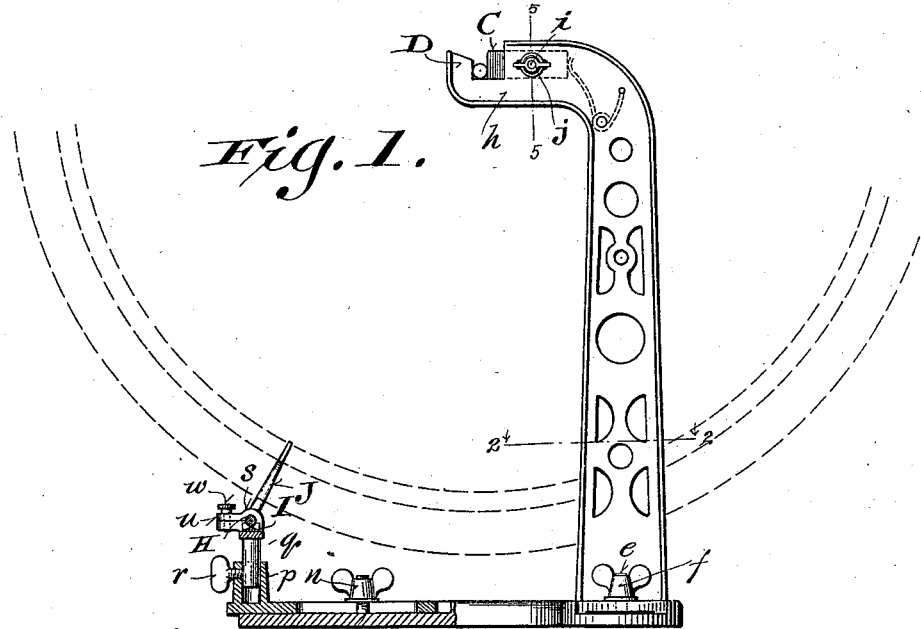
Fig. 1.
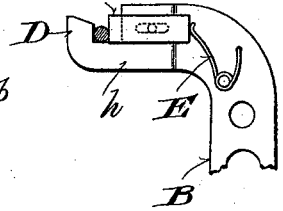
Fig. 5.
Fig. 2.
Fig. 3.
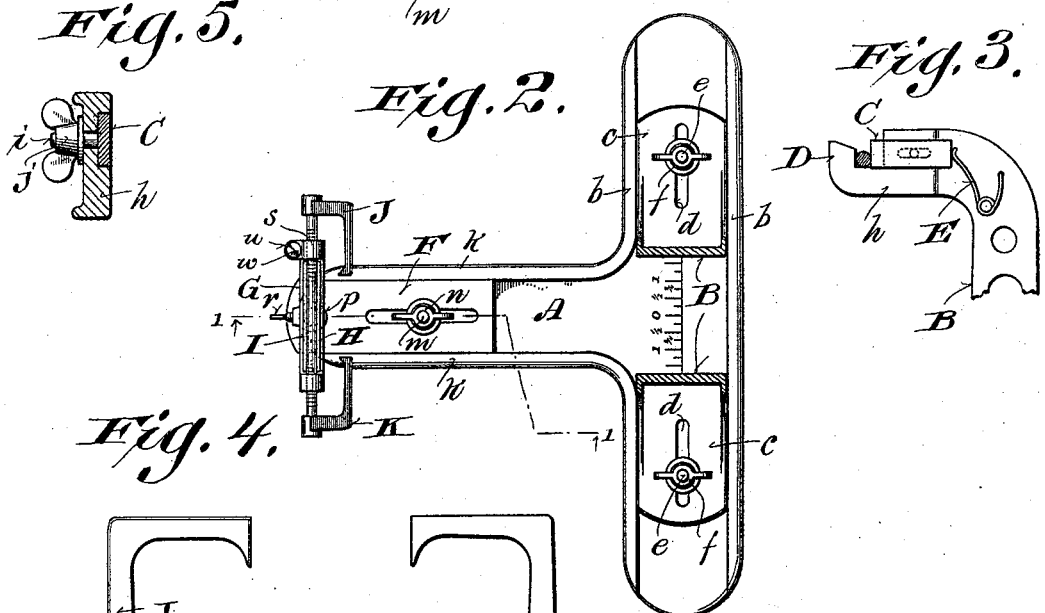
Fig. 4.
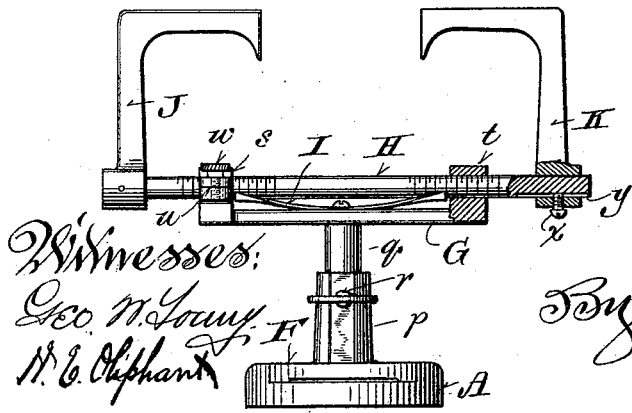
Witnesses:
Geo. N. Young
N. E. Oliphant
Inventor:
Albert Dudly
By H. G. Underwood
Attorney.
THE NORRIS PETERS CO., PHOTO-LITHO., WASHINGTON, D. C.

UNITED STATES PATENT OFFICE.

ALBERT DUDLY, OF MENOMINEE, MICHIGAN.

DEVICE FOR SUPPORTING AND TRUING WHEELS.

SPECIFICATION forming part of Letters Patent No. 536,377, dated March 26, 1895.

Application filed November 30, 1894. Serial No. 530,309. (No model.)

*To all whom it may concern:*

Be it known that I, ALBERT DUDLY, a citizen of the United States, and a resident of Menominee, in the county of Menominee and State of Michigan, have invented certain new and useful Improvements in Devices for Supporting and Truing Wheels; and I do hereby declare that the following is a full, clear, and exact description thereof.

My invention has for its object to provide a simple, economical and convenient tool for the cycle trade; and it consists in a wheel-balancer embodying certain peculiarities of construction and combination of parts hereinafter specified with reference to the accompanying drawings and subsequently claimed.

In the drawings: Figure 1 represents an elevation of my device partly in section on line 1 1 of the succeeding figure; Fig. 2, a plan view of the same partly in horizontal section on line 2—2 of the preceding figure; Fig. 3, a detail elevation illustrating one of the structural peculiarities of the device; Fig. 4, a front elevation partly in section illustrating an adjustable wheel-gage that constitutes another structural peculiarity of said device, and Fig. 5, a detail sectional view on line 5—5 of the first figure.

Referring by letter to the drawings A represents a preferably ⊣ shaped base provided with guide-ribs $b$ for the feet $c$ of standards B, and longitudinal slots $d$ in these feet are engaged by screw-threaded studs $e$ rising from the base. By means of set-nuts $f$ on the studs the standards are held in adjusted position on the base, and it is preferable to interpose washers between the set nuts and feet of said standards. Each standard terminates at its upper end in a vertically recessed horizontal arm $h$ provided with a longitudinal slot, and loose in guides on this arm is a movable jaw C having a screw-threaded lateral stud $i$ that extends through said slot to receive a set-nut $j$, whereby the plate may be clamped in adjusted position, it being preferable to interpose a washer between the nut and standard-arm. By recessing the standard-arms I obtain fixed jaws D and seats for whatever is to be held between them and the movable jaws C, the latter being under control of springs E secured to the standards. Ordinarily the set-nuts $j$ are adjusted so that the movable jaws C are free to automatically yield to wheel-axles of various diameter inserted between them and the opposing fixed jaws D, the play of said movable jaws in either direction being determined by the length of the slots in the standard arms, and it is to be understood that I may in some instances, omit said slots and means for clamping the aforesaid movable jaws in adjusted position, as this provision for clamping is more a matter of convenience than necessity.

From the foregoing it will be understood that the standards may be adjusted to accommodate wheel-hubs of various lengths, and that an axle supported by said standards is held against rotation. The structure thus far described is also applicable as a bicycle stand. As a matter of convenience I have provided the base A with a scale, as herein shown, in order that the adjustment of either or both standards may be accurately determined.

A longitudinally slotted plate F is loose on the base A between guide-ribs $k$, the latter being at right-angles to the ones $b$ above specified. A screw-threaded stud $m$ extends from the base through the plate-slot and a set-nut $n$ on the stud clamps the plate in adjusted position, a washer being preferably interposed between said nut and plate.

A vertical socket $p$ at the outer end of the plate F receives a shank $q$ that depends from a horizontal bar G central of the same, the shank being held at various elevations by means of a set-screw $r$ having its bearing in the socket.

The bar G is provided with bearings $s$ $t$, for a sliding rod H and a flat spring I centrally secured to said bar bears at its extremities against said rod to automatically hold the same in adjusted position under ordinary circumstances.

As herein shown, I may split the bearing $s$ for the rod H and provide said bearing with lateral extensions $u$ tapped to receive a clamp-screw $w$ the latter being tightened when it is desirable to effect a positive lock of said rod in adjusted position. In order that the longitudinal adjustment of the rod may be accurately determined I provide it with a scale.

Secured to the rod H outside of its bearings are right-angle arms J, K, the latter of these arms being preferably adjustable longitudinally of said rod and held in adjusted position by means of a set-screw $x$ as illustrated in Fig. 4. The arm J is held against rotation on the rod H by any suitable means, and the engagement of the set-screw $x$ with a groove $y$ in said rod holds the arm K against rotation thereon.

The adjustable rod and its arms constitute a gage for balancing a wheel supported by the standards, the plate F and bar G being adjusted to accommodate the gage to wheels of various diameters.

By rotary and longitudinal adjustment of the gage either arm thereof may be set to impinge against an edge or the periphery of a wheel-rim and the arm K being adjustable said gage may be utilized to accommodate wheel-rims of various widths, a scale on said rod being useful for accurately determining the set of said adjustable arm.

By means of the gage and its various possible adjustments the absolute truing of a bicycle wheel-rim is facilitated and assured.

Having thus described my invention, what I claim as new, and desire to secure by Letters Patent, is—

1. The combination of a suitable base, standards rising therefrom and having their upper ends in the form of vertically recessed horizontal arms, jaws movable on these horizontal standard arms longitudinally of the same, and suitable means for holding the jaws in adjusted position.

2. The combination of a suitable base, standards rising therefrom and having their upper ends in the form of vertically recessed horizontal arms, jaws movable on these horizontal standard-arms, and springs arranged to exert their power against said jaws.

3. The combination of a suitable base, standards rising therefrom, and having their upper ends in the form of vertically recessed horizontal arms, spring-controlled jaws movable on these horizontal standard-arms, and suitable means for locking the jaws in adjusted position.

4. The combination of a suitable base, standards adjustable on the base and having their upper ends in the form of vertically recessed horizontal arms, jaws movable on these horizontal standard-arms longitudinally of the same and suitable means for holding the jaws in adjusted position.

5. The combination of a suitable base provided with vertical studs, standards having slotted feet engaging the studs and their upper ends in the form of vertically recessed and longitudinally slotted horizontal arms, clamping devices on the studs, spring-controlled jaws movable on these horizontal standard-arms and provided with lateral studs engaging the slots therein, and clamping devices on the latter studs.

6. The combination of a suitable base, wheel-supports rising therefrom, a horizontal bar having its support on the base forward of the wheel-supports, a rod adjustable in bearings on the bar, and right-angle arms on the rod.

7. The combination of a suitable base, wheel-supports rising therefrom, a horizontal bar having its support on the base forward of the wheel-supports, a rod in bearings on the bar, a tension-spring on said bar exertive against the rod, and right-angle arms on said rod.

8. The combination of a suitable base, wheel-supports rising therefrom, a horizontal bar having its support on the base forward of the wheel-supports, a rod adjustable in bearings on the bar, a right-angle arm fixed on one end of the rod, and a similar arm adjustable on the other end of said rod.

9. The combination of a suitable base, wheel-supports rising therefrom, a vertically adjustable horizontal bar having its support on the base forward of the wheel-supports and a rim-gage adjustable on the bar.

10. The combination of a suitable base, wheel-supports rising therefrom, a plate longitudinally adjustable on the base forward of the wheel-supports, a vertical socket on the plate, a horizontal bar having a shank adjustable in the socket, and a rim-gage adjustable on the bar.

11. The combination of a suitable base, wheel-supports rising therefrom, a horizontal bar provided with bearings at least one of which is in the form of a clamp, and a rim-gage comprising a rod in said bearings and right-angle arms on the rod.

12. The combination of a suitable base provided with wheel-supports, a plate longitudinally adjustable on the base forward of the wheel-supports, a vertical socket on the plate, a horizontal bar having a shank adjustable in the socket, a rod in bearings on the bar, a tension spring on said bar exertive against the rod, and right angle arms on said rod outside its bearings.

In testimony that I claim the foregoing I have hereunto set my hand, at Menominee, in the county of Menominee and State of Michigan, in the presence of two witnesses.

ALBERT DUDLY.

Witnesses:
FRANKLIN H. BROWN,
RICHARD BERG.